Figure 1:
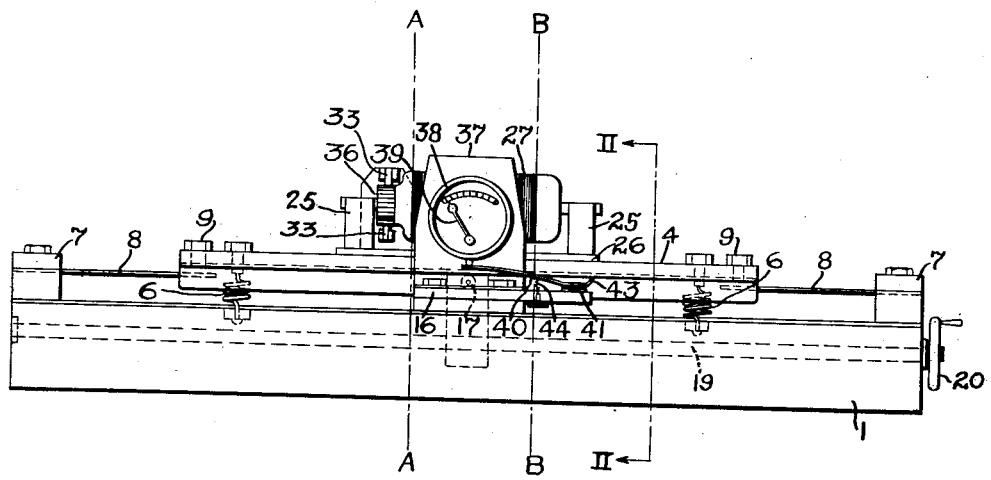

April 10, 1928.

C. R. SÖDERBERG 1,665,938

BALANCING MACHINE

Filed Oct. 11, 1922

WITNESSES:
R. J. Butler.
W. B. Jaspert.

INVENTOR
Carl Richard Soderberg.
BY
Wesley G. Carr
ATTORNEY

Patented Apr. 10, 1928.

1,665,938

UNITED STATES PATENT OFFICE.

CARL RICHARD SÖDERBERG, OF EDGEWOOD, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed October 11, 1922. Serial No. 593,732.

My invention relates to balancing machines, more specifically to machines adapted to indicate the degree of unbalance of a rotatable body to be tested.

It is among the objects of this invention to provide a device of the above-designated character which shall be adapted to indicate the amount and relative location of unbalance of a rotatable body in a simple and reliable manner.

It is a further object of my invention to provide a device which shall be of simple construction, inexpensive to manufacture and adapted to test rotors, such as armatures for electrical machines, for the correction of unbalanced mass, in a relatively short period of time.

It is still a further object of my invention to provide a balance-testing device which shall be adapted to test very small high-speed bodies, such as armatures for electric machines having low degrees of unbalance.

A testing machine of the general type heretofore employed consisted of a stationary support having a movable bed hinged or supported at one end thereon and having its other end yieldingly supported by coil springs to permit of vibration when acted upon by centrifugal forces from a rotating body mounted thereon. The unbalance producing the centrifugal forces was measured by means of an artificial unbalance introduced to maintain equilibrium with the unbalance to be measured. A testing device of the type just mentioned necessitated a previous static balancing operation which had to be completed before dynamic unbalance could be determined.

A balancing machine of the character designated is not adapted for testing small rotating bodies because the principle is such as to make a suitable design of this type impractical in view of the errors introduced into the balancing procedure. The adjustment of the counterbalancing device produces errors having a magnitude of the same order as the unbalance to be tested. Furthermore, the procedure of manipulating such a device is so complicated as to make it impractical to meet the requirements of a manufacturer of small motors in large numbers.

My invention is directed to a device that will obviate the above-noted difficulties and be adapted to test the unbalance of small rotating bodies quickly and accurately. To accomplish this, I provide a vertically oscillating bed yieldingly mounted upon a fixed or stationary support by means of a plurality of springs and having a movable fulcrum disposed therebetween. I further provide an indicator which is adapted to register the angular deflection of the vibrating bed and the relative angular location of the point of unbalance.

The device is designed in such manner as to give the same natural period of vibration for any location of the fulcrum. This is obtained by making the moment of inertia of the vibrating system with regard to an axis coinciding with the neutral location of the fulcrum, which is in the same transverse plane as the center of gravity and equi-distant from the springs, equal to the mass of the vibrating system multiplied by the square of one-half the distance between the springs. The spring members must be at equal distances from the center of gravity of the vibrating system and their characteristics must be identical.

The state of unbalance of a rotating body is the effect of its principal axis of inertia not being coincident with the geometrical axis of rotation. The process of balancing is, therefore, the process of determining the magnitude and location of such masses as will displace the principal axis of inertia in such manner that it will coincide with the geometrical axis of rotation. The principal axis of an unbalanced body is generally so located in the body as to permit of moving the same by a parallel motion and rotation to make it coincide with the axis of rotation.

The movement of the principal axis parallel with itself until it intersects the axis of rotation in the center of gravity, represents the correction for static unbalance. The subsequent rotation of the principal axis until it coincides with the axis of rotation represents the correction for dynamic unbalance. It is evident that the order in which these movements are made is immaterial. The corrections are necessarily fixed by the addition of certain masses.

Figure 2:
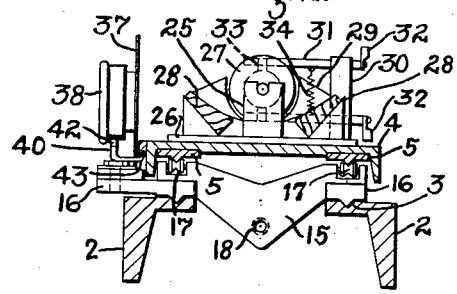
Figure 3:
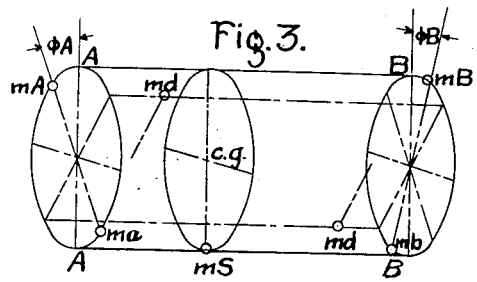

In the accompanying drawing constituting a part hereof and in which like reference characters designate like parts, Figure 1 is a side elevational view of a device embodying the principle of this invention;

Fig. 2 is a cross-sectional view thereof, partially in elevation, taken along the line II—II of Fig. 1; and Fig. 3 is a diagrammatic view of a rotating body adapted to be tested by the device illustrated in Fig. 1, which indicates the general condition of unbalance of such body.

Referring to Fig. 1, my device consists of a stationary support 1, such as a pair of longitudinal side frames 2 provided with substantially V-shaped longitudinal guideways 3 and secured by suitable transverse tie rods (not shown). A bed 4, comprising a substantially channel shape member and having a pair of knife edges 5 on the under side thereof, is yieldingly mounted thereon by means of a plurality of springs of identical characteristics, such as coil springs 6 located an equal distance from the center of gravity of the bed. The ends of the bed 1 are provided with mounting brackets 7 adapted to secure flexible straps 8 projecting longitudinally of the bed 4 and engaging screw plugs 9 on said bed to laterally restrain movement of the bed 4 but in such manner as to provide longitudinal and vertical movement thereof.

A fulcrum member, comprising a crossbeam 15 secured to a pair of movable blocks 16 adapted to seat in the V-shaped ways 3 and provided with a plurality of grooved rollers 17, is disposed between the bed 4 and the support 1 in such manner as to effect engagement of the rollers 17 with the knife edges 5. The beam 15 is provided with a threaded opening 18 which is adapted to receive a screw 19 rotatably mounted in the support 1 and provided with a hand wheel 20.

A plurality of roller blocks 25 are attached to a plate 26 secured to the bed 4 and are adapted to rotatably mount a rotor 27, such as an armature, to be tested. A pair of stationary field coils 28, provided with laminated cores 29, are disposed between the roller blocks 25 and secured to the plate 26 to provide an energizing field in which the armature 27 rotates. A binding post 30, having a pair of cantilever arms 31 pivotally mounted thereon, is secured to the plate 26 in proximity to the commutator end of the armature 27. The cantilevers 31 are provided with terminals 32 and contact brushes 33, and a coil spring 34 is secured therebetween to effect engagement of the brushes 33 with the commutator 36 of the armature.

An indicating device, comprising an L-shaped support 37 to which is secured an indicating dial 38 calibrated in ounces or in any suitable manner and provided with an indicator 39, is secured to one of the plates 16 of the fulcrum member 15. A lever 40, resting upon a knife edge 41 secured to the plates 16 and having its other end in engagement with a movable shaft 42 of the indicating device, is provided with a contact point 43 which is in constant engagement with the bed plate 4. The lever 40 is further provided with a spring 44 adapted to retain it in its neutral or zero position.

Fig. 3 illustrates the general state of unbalance in a rotor to be tested. The static unbalance is represented by a mass $mS$ located in the same transverse plane as the center of gravity $cg$. The dynamic unbalance is represented by the two masses $md$, located in two different transverse planes and at equal distance from the axis of rotation. This system of three masses may be replaced by two masses $ma$ and $mb$ located in the transverse planes A—A and B—B. The general state of unbalance may, therefore, be corrected by the addition of two masses $mA$ and $mB$ identical with masses $ma$ and $mb$. The location of these masses with respect to the static plane AA—BB is indicated by the angles $\emptyset A$ and $\emptyset B$.

The operation of this device is briefly as follows:—A rotor to be tested, such as an armature 27, is tested on a pair of parallel ways to determine the plane of static unbalance which is marked on the light side of the rotor indicated by the upper line A—B (Fig. 3). The magnitude of the static unbalance is of no consequence and need not be determined. The rotor is then mounted on the bearing blocks 25 and actuated by the energy supplied to the stationary field coils 28 and the armature.

Assuming that a correction is to be made for unbalance in two transverse planes, such as A—A and B—B (Figs. 1 and 3), which should have facilities for the addition of correction weights, the fulcrum, which is the rollers 17, is moved longitudinally into alinement with one of these planes, let us say, plane B—B. The speed of the rotor is adjusted to synchronize with the natural period of vibration of the bed 4. This condition of resonance is indicated by a sudden increase in the amplitude indicated by the indicator on the dial. The amplitude thus indicated is a measure of the mass $mA$ to be applied in the transverse plane A—A. The mass to be applied in the transverse plane B—B is obtained by moving the fulcrum into the plane A—A, the amplitude indicating the weight $mB$.

It is then necessary to locate the correction weights with reference to the static plane AA—BB more specifically to determine the angles $\emptyset A$ and $\emptyset B$. These angles are obtained by comparison of the readings already recorded with a third reading which is the minimum reading obtained by moving the fulcrum 17 along the rotor 27. It is readily seen, in Fig. 3, that the two masses $ma$ and $mb$ give a varying unbalanced moment for varying locations of the fulcrum. One specific location of the fulcrum will, in general, give a minimum reading. The quotient of this minimum reading and the reading obtained for the fulcrum located in plane B—B gives the sine of the angle ØA. In a similar manner, the quotient of the minimum reading and the reading obtained for the fulcrum located in plane A—A gives the sine of the angle ØB. These angles ØA and ØB determine the points of location for the correction masses mA and mB with respect to the static plane AA—BB. It will be necessary to determine by trial on which side of the line A—B the correction weights are to be applied.

The minimum reading may be employed in another manner as follows. If the two weights mA and mB are applied in the static plane AA—BB the minimum reading is a measure of the residuary unbalance. It thus enables the operator to decide whether it is necessary to locate the correction weights outside the static plane. If the static and dynamic unbalance are located in the same plane, the residuary unbalance is zero. This is likewise true if the dynamic unbalance is zero. In these instances, the condition of balance, if the corrections were made in the static plane, would be perfect. In all other cases, the balance would be approximately as indicated by the minimum reading. In other words, the amplitude of the minimum reading would indicate whether the correction, if made in the static plane, would be consistent with the degree of balance desired.

The correction may be made in still another manner by determining the minimum reading and locating its transverse plane on the rotor in a suitable manner, as by marking. The fulcrum is then moved a certain distance from the plane thus located and a reading taken. The reading obtained at the latter location of the fulcrum determines the mass to be applied in the transverse plane previously marked on the body. The balance obtained is approximate to a degree as indicated by the minimum reading. This test necessitates but one reading in addition to the minimum reading, and the balance is obtained by the addition of a single weight.

The actual corrections need not be made on the balancing machine but the amount and approximate location may be indicated on the rotor and then corrected after it is removed from the testing machine, thus permitting of testing a large number of such bodies in a short period of time and greatly increasing the capacity of the testing device.

It will be readily understood from the above description of my invention that a balancing machine made in accordance therewith constitutes a simple and expedient means for testing small armatures or rotor bodies in an efficient manner and that such a device permits of corrections which can be conveniently and accurately located.

Although I have described a specific embodiment of my invention, it will be obvious to those skilled in the art that various modifications may be made in the details of construction without departing from the principles herein set forth. For instance, the general construction of the support, the oscillating bed, the design of the fulcrum and the type of indicator used may be altered to suit the specific application of the device relative to the sizes and types of rotors to be tested.

I claim as my invention:—

1. In a balancing machine, the combination with a supporting frame, of a vertically oscillatable bed yieldingly mounted thereon, a movable fulcrum interposed between said bed and said supporting frame, said bed and springs being arranged to possess a constant period of vibration for all positions of the fulcrum, means for rotatably mounting a body to be tested on said bed and means on said bed for actuating said body.

2. In a balancing machine, the combination with a supporting frame, of a vertically oscillatable bed, a movable fulcrum interposed therebetween, means for rotatably mounting the body to be tested on said bed actuating means mounted on said bed and means for moving said fulcrum relative to said bed and said supporting frame the spring supports and the mass of said bed being so proportioned that the natural period of vibration thereof remains the same for all positions of the fulcrum.

3. In a balancing machine, the combination with a supporting frame, of a vertically oscillatable bed, a plurality of helical springs upon which said bed is yieldingly mounted, a movable fulcrum interposed between said bed and said supporting frame, flexible straps secured at the respective ends of said bed to restrain relative lateral movement thereof, means for rotating the body to be tested, and means for moving said fulcrum relative to the longitudinal axes of said bed and said supporting frame.

4. In a balancing machine, the combination with a supporting frame, of a vertically oscillatable bed, a plurality of helical springs upon which said bed is yieldingly mounted, a movable fulcrum interposed between said bed and said supporting frame, flexible straps secured at the respective ends of said bed to restrain relative lateral movement thereof, means for rotating the body to be tested, and means for moving said fulcrum relative to the longitudinal axes of said bed and said supporting frame, said last-named means comprising a manually operated screw-and-nut mechanism.

5. In a balancing machine, the combination with a support, of a vertically oscillatable bed, means on said bed for rotatably supporting a body to be tested, means for rotating said body on said support, a movable fulcrum interposed between said bed and said support, said supporting means comprising a plurality of roller blocks secured to said bed, and said rotating means comprising a pair of stationary field coils attached thereto between said blocks and connected to a source of electrical energy.

6. In a balancing machine, the combination with a supporting frame having a pair of longitudinal parallel guide-ways, of a vertical oscillating bed having a pair of corresponding ways in alinement with said supporting frame, a plurality of coil springs disposed between and secured to said bed and said supporting frame, a movable fulcrum comprising a cross-beam adapted to engage the guide-ways of said supporting frame and having a pair of rollers mounted therein to co-operatively engage the guide-ways of said bed, a plurality of supports secured to the bed to receive an armature to be tested, a pair of stationary field coils attached to the bed between said blocks to actuate said armature, and an indicating device attached to said fulcrum member having a contact lever in engagement with said bed to indicate the amplitude of the movement thereof.

7. A balancing machine comprising a base, spring members mounted on the base, an oscillatable bed yieldingly mounted on the spring members, a movable fulcrum having its axis in a transverse plane of the rotor interposed between the bed and the base, means for rotatably supporting a body to be tested on the bed, and means carried by the bed for actuating said body, said bed and springs being disposed to possess a constant natural period of vibration for all positions of the fulcrum.

8. In a balancing machine, a vibrating system, means carried by said vibrating system for rotatably supporting a rotor to be tested, means associated with said vibrating system for actuating the rotor and a movable fulcrum member having its axis disposed in a transverse plane of the rotor, said vibrating system being proportioned so that with a given rotor to be tested the natural period of vibration will be the same for all positions of the fulcrum member.

9. A balancing machine comprising a base, resilient elements mounted on the base, an oscillatable bed carried by the resilient elements, a longitudinally movable fulcrum member interposed between the base and the bed, means mounted on the bed for rotatably supporting a body to be tested and means on the bed for rotating the body to be tested, the mass of the bed and the rotor to be balanced and the resilience of the resilient elements being proportioned so that the oscillating system possesses a constant natural period of vibration for any position of the fulcrum member.

10. A balancing machine comprising a base, spring members mounted on the base, a bed member supported by the spring members, a longitudinally movable fulcrum member interposed between the bed and the base, and means on the bed for actuating a rotor to be balanced, said spring members and bed being adapted to possess a constant natural period of vibration for any location of the fulcrum member with a given rotor to be balanced.

11. In a balancing machine, a supporting frame, a vertically oscillatable bed yieldably mounted thereon, spring elements and a longitudinally movable fulcrum member interposed between the bed and the supporting frame, and means on said bed for actuating a body to be tested, said bed and springs being arranged to possess a constant natural period of vibration for all positions of the fulcrum member with a given body to be tested.

12. A balancing machine comprising a supporting frame, an oscillatable bed resiliently mounted thereon, a movable fulcrum member interposed between the oscillatable bed and the supporting frame and flexible straps secured to the bed and the supporting frame to restrain relative longitudinal movement of the bed and frame.

13. In a machine for balancing the rotors of electrical machines, the combination with a supporting member and an oscillatable bed, of means carried by the bed for rotatably supporting a rotor to be tested and means comprising a plurality of field coils on said bed for cooperating with the rotor to actuate it.

14. In a balancing machine, an oscillating system, means mounted on the oscillating system for journalling an armature to be balanced, a field structure mounted on the oscillating system and means for supplying electric current to the field structure and the armature to actuate the latter.

15. In a machine for balancing armatures, an oscillating system, field coils provided on the oscillating system, means on the oscillating system for journalling an armature to be balanced in cooperative relation to the field coils and means for supplying electric current to the field coils and the armature to actuate the armature.

In testimony whereof, I have hereunto subscribed my name this 7th day of October, 1922.

CARL RICHARD SÖDERBERG.